United States Patent
Sasaki et al.

(10) Patent No.: US 12,476,283 B2
(45) Date of Patent: Nov. 18, 2025

(54) ELECTROLYTE SOLUTION FOR LITHIUM ION SECONDARY BATTERY

(71) Applicant: VEHICLE ENERGY JAPAN INC., Hitachinaka (JP)

(72) Inventors: Hironori Sasaki, Ibaraki (JP); Takeshi Miki, Ibaraki (JP); Shuichi Suzuki, Ibaraki (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 404 days.

(21) Appl. No.: 16/957,657

(22) PCT Filed: Nov. 28, 2018

(86) PCT No.: PCT/JP2018/043688
§ 371 (c)(1),
(2) Date: Jun. 24, 2020

(87) PCT Pub. No.: WO2019/130958
PCT Pub. Date: Jul. 4, 2019

(65) Prior Publication Data
US 2021/0057779 A1    Feb. 25, 2021

(30) Foreign Application Priority Data
Dec. 26, 2017  (JP) .................. 2017-249686

(51) Int. Cl.
*H01M 10/0569* (2010.01)
*H01M 10/0525* (2010.01)
*H01M 10/0568* (2010.01)

(52) U.S. Cl.
CPC ............... *H01M 10/0568* (2013.01); *H01M 10/0525* (2013.01); *H01M 10/0569* (2013.01); *H01M 2300/004* (2013.01)

(58) Field of Classification Search
CPC ......... H01M 10/0525; H01M 10/0568; H01M 10/0569; H01M 2300/0004
See application file for complete search history.

(56) References Cited

U.S. PATENT DOCUMENTS 6,210,835 B1 *  4/2001  Arai ................ H01G 11/64
                                          429/231.95
2007/0224514 A1 * 9/2007  Kotato ........... H01M 10/0567
                                          429/325

(Continued)

FOREIGN PATENT DOCUMENTS

CN    103943884 A  *  7/2014  ........ H01M 10/0525
CN    107078354 A      8/2017
(Continued)

OTHER PUBLICATIONS

Supplementary European Search Report issued on Aug. 23, 2021 for European Patent Application No. 18894758.4.
(Continued)

*Primary Examiner* — Osei K Amponsah
(74) *Attorney, Agent, or Firm* — Volpe Koenig

(57) ABSTRACT

An electrolyte solution for lithium ion secondary cell capable of suppressing a decomposition reaction of a graphite negative electrode by optimizing an amount of a cyclic carbonate, and capable of improving a cell performance in a low temperature range. The electrolyte solution for lithium ion secondary cell of the present invention includes; 10 volume % to 20 volume % of ethylene carbonate (EC) and/or propylene carbonate (PC) as a cyclic carbonate; 0.38 mol/L to 0.75 mol/L of at least one selected from lithium hexafluorophosphate (LiPF6), lithium tetrafluoroborate (LiBF4), or lithium bis(oxalate) borate (LiBOB) as a first lithium salt; and a lithium imide salt. A sum of the lithium imide salt and the first lithium salt is in a range of 0.5 mol/L (Continued)

to 1.5 mol/L, and a mole ratio of the cyclic carbonate/the first lithium salt is in a range of 3 to 5.

9 Claims, 5 Drawing Sheets

(56) References Cited

U.S. PATENT DOCUMENTS

| | | | |
|---|---|---|---|
| 2009/0123848 A1* | 5/2009 | Matsui | H01G 11/60 429/324 |
| 2012/0258357 A1 | 10/2012 | Kim | |
| 2013/0330610 A1* | 12/2013 | Shigematsu | H01M 10/0567 429/200 |
| 2014/0186722 A1 | 7/2014 | Lim et al. | |
| 2014/0322576 A1* | 10/2014 | Okumura | H01M 10/0587 429/94 |
| 2014/0342241 A1 | 11/2014 | Lim et al. | |
| 2015/0380768 A1* | 12/2015 | Mizuno | H01M 10/0569 429/338 |
| 2017/0345583 A1 | 11/2017 | Tsuzuki | |
| 2017/0352920 A1* | 12/2017 | Kawai | H01M 10/0569 |
| 2019/0312306 A1 | 10/2019 | Tamura et al. | |

FOREIGN PATENT DOCUMENTS

| | | |
|---|---|---|
| EP | 2230711 A1 | 9/2010 |
| JP | 2015-523701 A | 8/2015 |
| JP | 2016-018619 A | 2/2016 |
| JP | 2017-084820 A | 5/2017 |
| KR | 2014-0138078 A | 12/2014 |
| WO | 2017/217407 A1 | 12/2017 |

OTHER PUBLICATIONS

International Search Report and English Translation, PCT/JP2018/043688 Mar. 26, 2019, 2 pgs.
Chinese Office Action issued on Jul. 26, 2023 for Chinese Patent Application No. 201880083634.4.

\* cited by examiner

ELECTROLYTE SOLUTION FOR LITHIUM ION SECONDARY BATTERY

TECHNICAL FIELD

The present invention relates to an electrolyte solution for lithium ion secondary cell.

BACKGROUND ART

Recent power sources for mobile communications, such as a mobile phone and a portable PC, have been desired to be more and more reduced in size and increased in energy density (higher capacity), and an electric vehicle, a hybrid vehicle, and a hybrid train, which use electric power as a part of the power, have been put into practical application. Furthermore, from the aspect of environmental protection, not only a power source for storing midnight electric power but also a power source for storing power combined with a solar cell and/or a wind power generation has been developed. While a lithium ion secondary battery has been attracting attention under such a condition, since the lithium ion secondary battery exhibits decrease in charge/discharge efficiency caused by repeated charge and discharge, a lithium ion secondary battery where the deterioration over time is small in battery performance is desired.

As an electrolyte solution used for a lithium ion secondary battery, Patent Literature 1 discloses a nonaqueous electrolyte solution containing i) a nonaqueous organic solvent that contains propylene carbonate (PC) and ethylene carbonate (EC); and ii) lithium bis(fluorosulfonyl)imide (LiFSI). In addition, Patent Literature 1 discloses that a mixing ratio of the propylene carbonate to the ethylene carbonate is preferably 1:0.1 to 2 in weight ratio. Patent Literature 1 discloses that, in the lithium ion secondary battery that includes such a nonaqueous electrolyte solution, a firm SEI film is formed at a negative electrode during initial charging, which can improve output characteristics at low temperature and normal temperature, cycle characteristics at high temperature and normal temperature, and capacity characteristics after high temperature storage.

CITATION LIST

Patent Literature

Patent Literature 1: JP 2015-523701 A

SUMMARY OF INVENTION

Technical Problem

Conventionally, as the nonaqueous electrolyte solution, various nonaqueous organic solvents have been examined up to the present, and propylene carbonate (PC) and ethylene carbonate (EC) have been used as polar solvents. However, the propylene carbonate (PC) has a problem of causing an irreversible decomposition reaction with a graphite negative electrode. In view of this, generally, the ethylene carbonate (EC) has been basically used as the nonaqueous organic solvent. However, since the ethylene carbonate (EC) has a high melting point, there is a problem in that the viscosity of the nonaqueous organic solvent increases to cause deterioration in the battery characteristics in a low temperature range.

For such a problem, Patent Literature 1 discloses that adjusting a mixing ratio of propylene carbonate (PC) and ethylene carbonate (EC) as organic solvents solves the problems caused by use of each of the propylene carbonate (PC) or the ethylene carbonate (EC), and a synergy effect by mixed use of the organic solvents is provided by taking advantages of the respective solvents.

However, in the electrolyte solution of Patent Literature 1, it is difficult to completely suppress the irreversible decomposition reaction of the graphite negative electrode by the propylene carbonate (PC), and the usage of the propylene carbonate (PC) is preferred to be decreased as much as possible, while increasing the ethylene carbonate (EC) arises a problem of increase of the viscosity in the low temperature range. Therefore, the present invention has an object to provide an electrolyte solution for lithium ion secondary battery capable of suppressing a decomposition reaction of a graphite negative electrode by optimizing an amount of a cyclic carbonate, such as ethylene carbonate (EC) and propylene carbonate (PC), and capable of improving a battery performance in a low temperature range.

Solution to Problem

To solve the above-described problems, an electrolyte solution for lithium ion secondary cell of the present invention comprises; 10 volume % to 20 volume % of ethylene carbonate (EC) and/or propylene carbonate (PC) as a cyclic carbonate; 0.38 mol/L to 0.75 mol/L of at least one selected from lithium hexafluorophosphate ($LiPF_6$), lithium tetrafluoroborate ($LiBF_4$), or lithium bis(oxalate)borate (Li-BOB) as a first lithium salt; and a lithium imide salt. A sum of the lithium imide salt and the first lithium salt is in a range of 0.5 mol/L to 1.5 mol/L, and a mole ratio of the cyclic carbonate/the first lithium salt is in a range of 3 to 5.

Advantageous Effects of Invention

With the present invention, since the lithium imide salt easily dissociate to give lithium ions, the polar solvent does not have to be used in a large amount. Accordingly, the amount of the cyclic carbonate, such as the ethylene carbonate (EC), necessary for dissociating the first lithium salt is optimized, thus suppressing the decomposition reaction of the graphite negative electrode and decreasing the viscosity as a whole of the organic solvent to improve the cell performance especially in the low temperature range. Problems, configurations, and effects other than ones described above will be clarified in the following explanation of embodiments.

DESCRIPTION OF EMBODIMENTS

Figure 1:
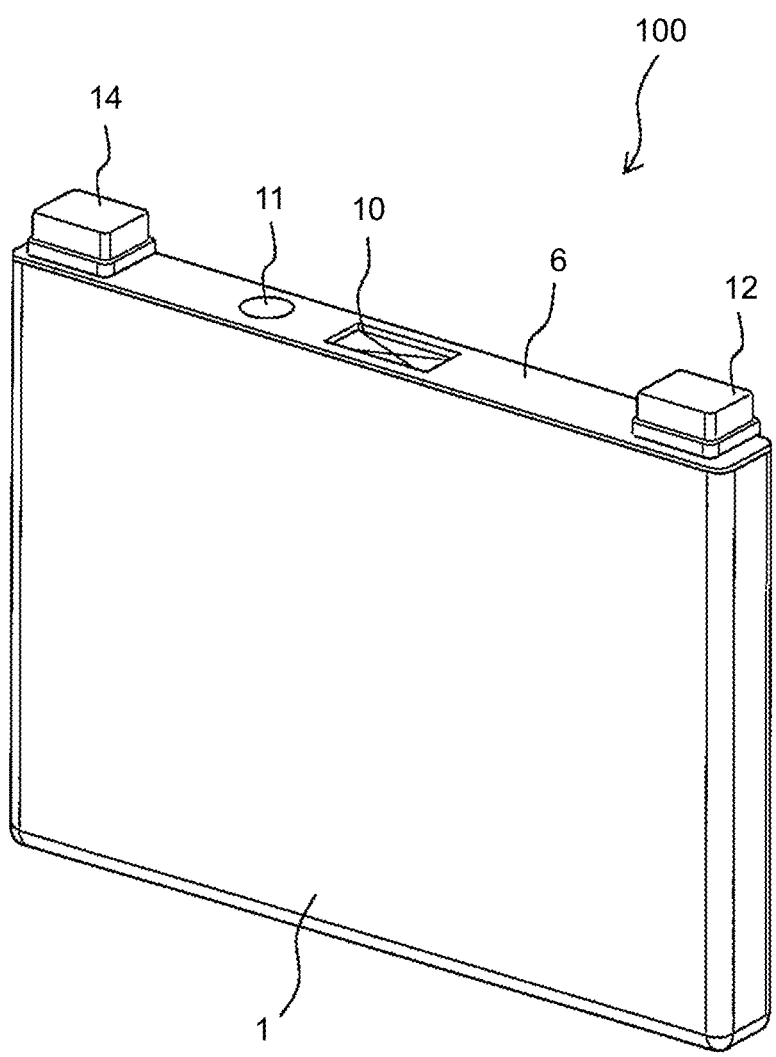
FIG. 1 is an external perspective view of a flat wound lithium ion secondary cell.

The following describes the embodiment of the present invention using the drawings and the like. The present invention is not limited to these descriptions, and various changes and modifications by those skilled in the art can be made within the scope of the technical ideas disclosed in the Description. In all the drawings for describing the present invention, same reference numerals are attached to those having the same functions, and their repeated descriptions will be omitted in some cases.

Figure 2:
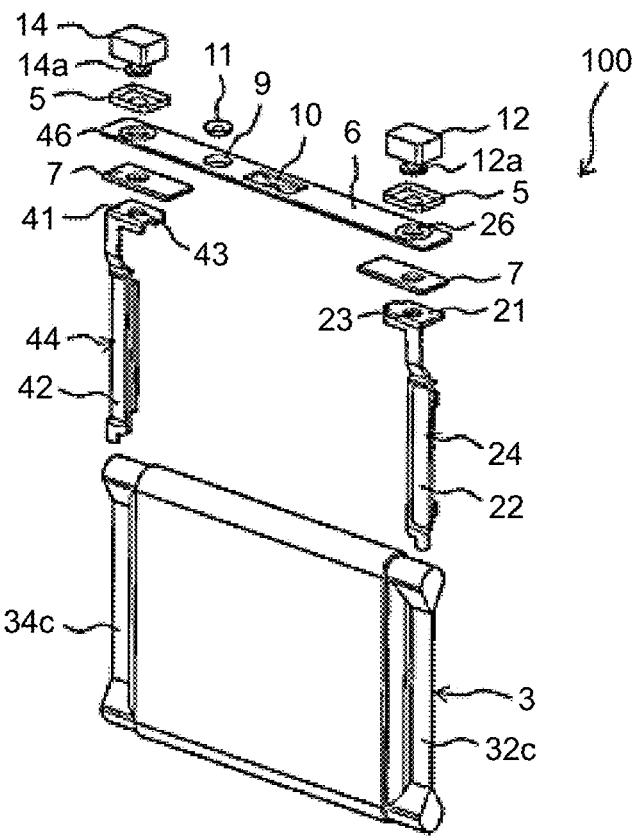
FIG. 2 is an exploded perspective view of the flat wound lithium ion secondary cell.
Figure 2:
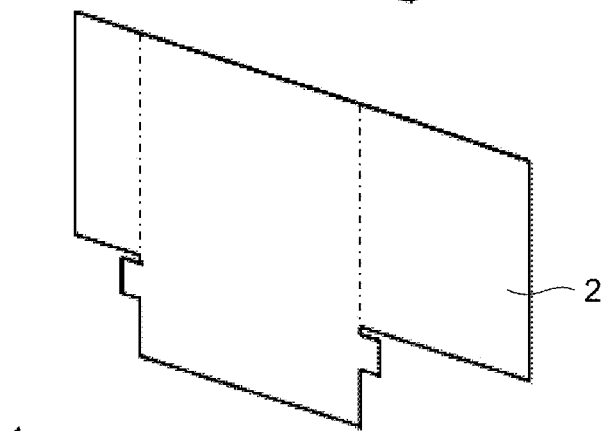
Figure 2:
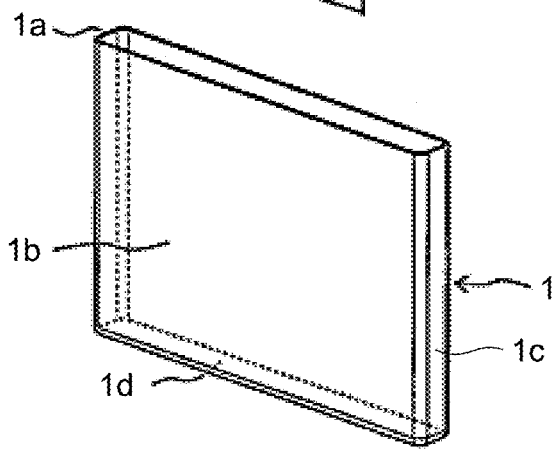

As one embodiment of a lithium ion secondary cell using an electrolyte solution according to the present invention, a configuration of a flat wound lithium ion secondary cell will be described based on FIGS. 1 to 3. FIG. 1 is an external perspective view of the flat wound lithium ion secondary cell, and FIG. 2 is its exploded perspective view.

A flat wound lithium ion secondary cell 100 includes a cell can 1 and a cell lid 6. The cell can 1 has side surfaces and a bottom surface 1d, and has an opening 1a at an upper portion of the cell can 1. The side surfaces include a pair of opposing wide-width side surfaces 1b having relatively large areas and a pair of opposing narrow-width side surfaces 1c having relatively small areas.

The cell can 1 houses a wound group 3 with an insulation protection film 2, and the opening 1a of the cell can 1 is sealed by the cell lid 6. The cell lid 6 has an approximately rectangular flat plate shape, and is welded so as to cover the opening 1a on the upper side of the cell can 1, thus sealing the cell can 1. The cell lid 6 is provided with a positive electrode external terminal 14 and a negative electrode external terminal 12. Via the positive electrode external terminal 14 and the negative electrode external terminal 12, the wound group 3 is charged, and an electric power is supplied to an external load. The cell lid 6 integrally includes a gas discharge valve 10, and an increase of a pressure inside a cell container opens the gas discharge valve 10 to discharge a gas from the inside, thus reducing the pressure inside the cell container. Accordingly, the safety of the flat wound lithium ion secondary cell 100 is ensured.

Since the wound group 3 is wound in a flat shape, the wound group 3 has a pair of mutually opposing curving portions each having a semicircular shape in cross section and planar portions continuously formed between the pair of curving portions. The wound group 3 is inserted into the cell can 1 from one curving portion side so as to have a winding axis direction along a lateral width direction of the cell can 1, and the other curving portion side is disposed on the upper opening side.

The wound group 3 includes a positive electrode foil exposed portion 34c electrically connected to the positive electrode external terminal 14 disposed to the cell lid 6 via a positive electrode current collector plate (current collector terminal) 44. The wound group 3 includes a negative electrode foil exposed portion 32c electrically connected to the negative electrode external terminal 12 disposed to the cell lid 6 via a negative electrode current collector plate (current collector terminal) 24. Accordingly, the electric power is supplied from the wound group 3 to the external load via a positive electrode current collector plate 44 and a negative electrode current collector plate 24, and an externally generated power is supplied and charged to the wound group 3 via the positive electrode current collector plate 44 and the negative electrode current collector plate 24.

The cell lid 6 is provided with insulating plates 7 and gaskets 5 to electrically insulate the positive electrode current collector plate 44 and negative electrode current collector plate 24, and the positive electrode external terminal 14 and negative electrode external terminal 12, from the cell lid 6, respectively. After an electrolyte solution is injected into the cell can 1 from a liquid injection port 9, a liquid injection plug 11 is joined to the cell lid 6 by laser beam welding to seal the liquid injection port 9, thus sealing the flat wound lithium ion secondary cell 100.

Here, a material forming the positive electrode external terminal 14 and the positive electrode current collector plate 44 includes, for example, an aluminum alloy, and a material forming the negative electrode external terminal 12 and the negative electrode current collector plate 24 includes, for example, a copper alloy. A material forming the insulating plate 7 and the gasket 5 includes, for example, an insulating resin material, such as polybutylene terephthalate, polyphenylene sulfide, and perfluoroalkoxy fluororesin.

An electrolyte of the electrolyte solution injected into the cell can 1 contains at least one selected from lithium hexafluorophosphate ($LiPF_6$), lithium tetrafluoroborate ($LiBF_4$), or lithium bis(oxalate)borate (LiBOB) as a first lithium salt at a concentration from 0.38 mol/L to 0.75 mol/L. The electrolyte solution contains a lithium imide salt, and a sum of the first lithium salt and the lithium imide salt is in a range of 0.5 mol/L to 1.5 mol/L. As the lithium imide salt, lithium bis(fluorosulfonyl)imide (LiFSI) is preferably used. The LiFSI may be a commercial product, or one synthesized by a conventionally-known method may be used. Alternatively, as another lithium imide salt, lithium bis(trifluoromethanesulfonyl)imide (LiTFSI) is also preferably used.

As an organic solvent in the electrolyte solution, a cyclic carbonate, which is a polar solvent, is used by an amount of 10 volume % to 20 volume %. Furthermore, a chain carbonate is preferably mixed by an amount of 80 volume % to 90 volume %. The decreased cyclic carbonate fails to sufficiently dissociate the first lithium salt (for example, lithium hexafluorophosphate ($LiPF_6$)), thus reducing an electrical performance. When, for example, ethylene carbonate is applied as the cyclic carbonate, the increased cyclic carbonate increases the viscosity of the entire electrolyte solution to decrease the electrical conductivity, thus possibly reducing the cell performance especially at low temperature.

Therefore, a cyclic carbonate amount is adjusted so that a ratio of the number of moles of the cyclic carbonate to the number of moles of the first lithium salt (cyclic carbonate/first lithium salt) is in a range of 3 to 5, which allows sufficient dissociation of any of lithium hexafluorophosphate ($LiPF_6$), lithium tetrafluoroborate ($LiBF_4$), or lithium bis (oxalate)borate (LiBOB) as the first lithium salt. The ratio is preferably in a range of 3.5 to 4.5.

As the cyclic carbonate, ethylene carbonate (EC), propylene carbonate (PC), or both of them are used. Fluoro ethylene carbonate, vinylene carbonate, and the like may be contained as other cyclic carbonates. One cyclic carbonate may be used alone, or two or more types may be used in combination. When a material other than the ethylene carbonate (EC) or the propylene carbonate (PC) is used as the cyclic carbonate, the total amount of all the cyclic carbonates does not exceed 20 volume %.

When the chain carbonate is used, its type is not limited, and conventionally known various chain carbonates are applicable. Specifically, ethyl methyl carbonate (EMC), diethyl carbonate (DEC), dimethyl carbonate (DMC), and the like are included. Any one of the chain carbonates may be used alone, or two or more types may be used in combination.

The electrolyte solution for lithium ion secondary cell according to the embodiment may contain an additive as necessary to improve various cell performances. As the additive, for example, a sulfur-containing compound, such as dimethyl sulfone and tetramethylthiuram monosulfide; a carboxylic acid anhydride, such as 1-methyl-2-pyrrolidinone, 1-methyl-2-piperidone cyclohexanedicarboxylic acid anhydride, cyclopentane tetracarboxylic acid dianhydride, and phenylsuccinic acid anhydride; ethylene sulfite, 1,3-propane sultone, 1,4-butane sultone, methyl methanesulfonate, busulfan, sulfolane, and sulfolane are included. These additives are preferably used in a range of 0.1 mass % to 10 mass % in total in the electrolyte solution.

The positive electrode external terminal 14 and the negative electrode external terminal 12 include welded joint portions to be welded to be joined to busbars and the like. The welded joint portion has a rectangular parallelepiped block shape projecting upward from the cell lid 6, and has a configuration where its lower surface is opposed to a surface of the cell lid 6 and its upper surface is parallel to the cell lid 6 at a predetermined height position.

A positive electrode connecting portion 14a and a negative electrode connecting portion 12a have columnar shapes that project from the lower surfaces of the positive electrode external terminal 14 and the negative electrode external terminal 12 and have distal ends insertable through a positive electrode side through hole 46 and a negative electrode side through hole 26 of the cell lid 6, respectively. The positive electrode connecting portion 14a and the negative electrode connecting portion 12a pass through the cell lid 6 and project into the inside of the cell can 1 with respect to a positive electrode current collector plate base portion 41 and a negative electrode current collector plate base portion 21 of the positive electrode current collector plate 44 and the negative electrode current collector plate 24. Distal ends of the positive electrode connecting portion 14a and the negative electrode connecting portion 12a are crimped to integrally secure the positive electrode external terminal 14, the negative electrode external terminal 12, the positive electrode current collector plate 44, and the negative electrode current collector plate 24 to the cell lid 6. The gasket 5 is interposed between the cell lid 6 and each of the positive electrode external terminal 14 and negative electrode external terminal 12, and the insulating plate 7 is interposed between the cell lid 6 and each of the positive electrode current collector plate 44 and negative electrode current collector plate 24.

The positive electrode current collector plate 44 and the negative electrode current collector plate 24 include the positive electrode current collector plate base portion 41 and the negative electrode current collector plate base portion 21, and a positive electrode side connecting end portion 42 and a negative electrode side connecting end portion 22. The positive electrode current collector plate base portion 41 and the negative electrode current collector plate base portion 21 have rectangular plate shapes and are disposed to be opposed to the lower surface of the cell lid 6. The positive electrode side connecting end portion 42 and the negative electrode side connecting end portion 22 are bent at side ends of the positive electrode current collector plate base portion 41 and the negative electrode current collector plate base portion 21, extend along the wide-width surface of the cell can 1 toward the bottom surface side, and are connected to the positive electrode foil exposed portion 34c and the negative electrode foil exposed portion 32c of the wound group 3 with being opposed and superimposed thereto. The positive electrode current collector plate base portion 41 and the negative electrode current collector plate base portion 21 are provided with a positive electrode side opening hole 43 and a negative electrode side opening hole 23 through which the positive electrode connecting portion 14a and the negative electrode connecting portion 12a are inserted, respectively.

The insulation protection film 2 is wound around a peripheral area of the wound group 3 having a direction along a flat surface of the wound group 3 and a direction perpendicular to the winding axis direction of the wound group 3 as the central axis direction. The insulation protection film 2 is formed of one sheet or a plurality of film members made of synthetic resin, such as polypropylene (PP), and has a length capable of winding in a direction parallel to the flat surface of the wound group 3 and having a direction perpendicular to the winding axis direction as the winding center direction.

Figure 3:
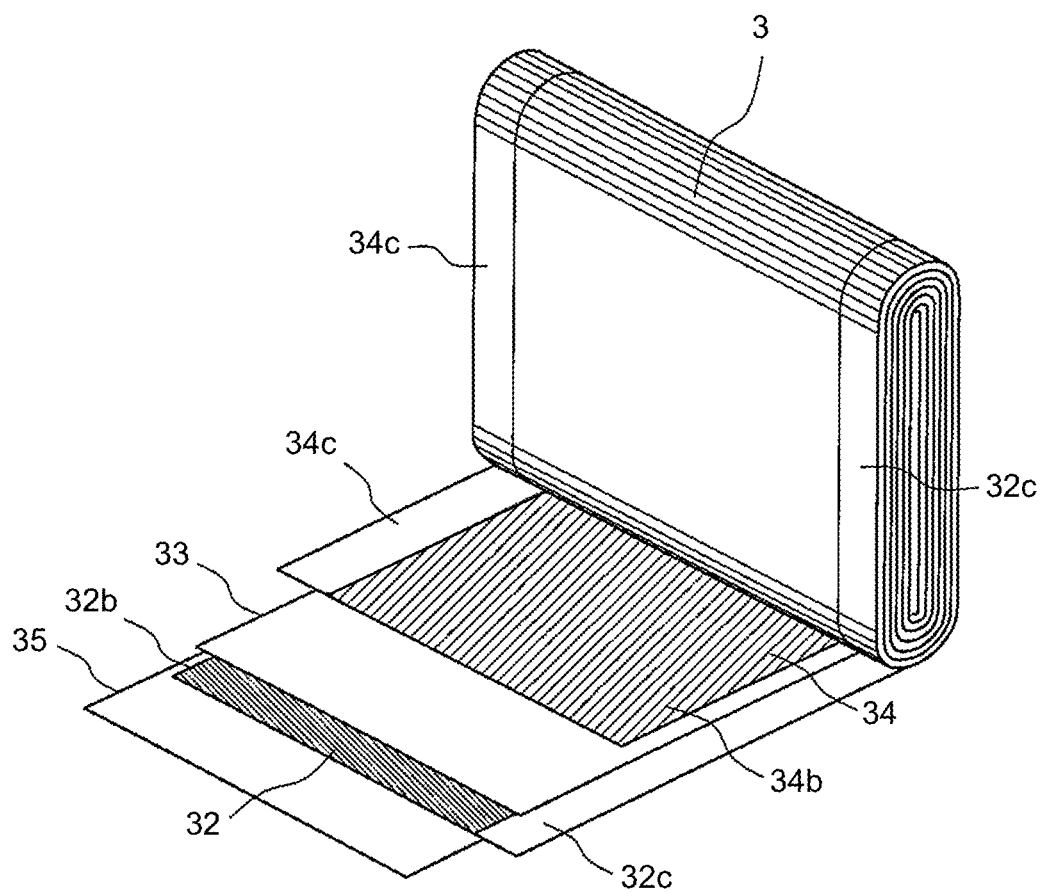
FIG. 3 is an exploded perspective view of an electrode wound group.

FIG. 3 is an exploded perspective view illustrating a deployed state of a part of the electrode wound group. The wound group 3 is formed by winding a negative electrode 32 and a positive electrode 34 in a flat shape with separators 33 and 35 interposed therebetween. In the wound group 3, the electrode on the outermost periphery is the negative electrode 32, and the separators 33, 35 are wound around further outside the negative electrode 32.

The separators 33, 35 have an insulation function to avoid short circuit of the positive electrode 34 and the negative electrode 32, and have a function of holding the nonaqueous electrolyte solution. As a preferred example, a porous sheet made of resin, such as polyethylene (PE), polypropylene (PP), polyester, cellulose, and polyamide, is included. The resin porous sheet may have a single layer structure, or may include multiple layers (for example, three-layer structure of PP/PE/PP).

Further preferably, the separators 33, 35 include layers formed of an inorganic material (alumina particles and the like) and the binder on one side or both sides. This prevents the separators 33, 35 from melting, which allows the separators 33, 35 holding the insulation function even when the lithium ion secondary cell is used in an abnormal state (for example, when the temperature of the secondary cell increases to 160° C. or more due to an overcharge, a crush, and the like), thus ensuring the safety.

A part of the negative electrode 32 over which a negative electrode mixture layer 32b is applied is larger in the width direction than a part of the positive electrode 34 over which a positive electrode mixture layer 34b is applied, thereby providing a configuration in which the part over which the positive electrode mixture layer 34b is applied is always sandwiched between the parts over which the negative electrode mixture layers 32b are applied. The positive electrode foil exposed portion 34c and the negative electrode foil exposed portion 32c are bundled at the planar portion and connected to each other by welding and the like. While the separators 33, 35 are wider in the width direction than the part over which the negative electrode mixture layer 32b is applied, since the separators 33, 35 are wound around so that the positive electrode foil exposed portion 34c and the negative electrode foil exposed portion 32c each have an end portion where the metal foil surface is exposed, the separators 33, 35 does not obstruct the bundling for welding.

The negative electrode mixture layer 32b applied over the negative electrode 32 is formed by applying a slurry obtained by dispersing a negative electrode active material and the binder in an appropriate solvent (for example, water or N-methyl-2-pyrolidone), and kneading them. The slurry applied over the negative electrode 32 is dried to remove the solvent, and subsequently the negative electrode 32 can be pressed to an appropriate thickness by a pressing machine.

The negative electrode active material includes a carbon material, such as a natural graphite, an artificial graphite, a non-graphitizable carbon (hard carbon), a graphitizable carbon (soft carbon). For the graphite, by coating the graphite surface with amorphous carbon, the reaction with the electrolyte solution more than necessary is avoided.

A material in which a carbon black, such as acetylene black, ketjen black, channel black, furnace black, lamp black, and thermal black, is mixed as a conductive auxiliary agent with a graphite material, and a material obtained by mixing the conductive auxiliary agent with the graphite material and subsequently coating them with an amorphous carbon to form a composite material are also applicable. A non-graphitizable carbon (hard carbon), a graphitizable carbon (soft carbon), and a metal oxide (iron oxide, copper oxide, and the like) may be mixed in a graphite.

The positive electrode 34 includes the positive electrode mixture layers 34b on both surfaces of the positive electrode foil as a positive electrode current collector. As a positive electrode active material contained in the positive electrode mixture layer 34b, while not limited, any one of materials known to be applicable to a positive electrode material of a lithium ion secondary cell may be used alone, or a plurality of types may be used in mixture. As a preferred example, a spinel-type ($LiMn_2O_4$ and the like), a layer-type ($LiCoO_2$, $LiNiO_2$, and the like), and an olivine-type ($LiFePO_4$ and the like) are included. A layer-type lithium nickel cobalt manganese composite oxide containing Li, Ni, Co, and Mn as constituent elements (for example, $LiNi_{0.33}Co_{0.33}Mn_{0.33}O_2$) is one of more preferred examples because it shows little change in lattice volume due to charge and discharge until a lithium ion desorption amount becomes $2/3$, thus having excellent durability.

As a winding core, for example, a winding core formed by winding a resin sheet having a flexural rigidity higher than that of any of the negative electrode 32, the positive electrode 34, or the separators 33, 35 can be used.

EXAMPLES

While the following describes the present invention further in detail based on examples and comparative examples, the present invention is not limited to these examples.
(Ionic Conductivity Measurement)

For an organic solvent, ethylene carbonate (EC) was used as the cyclic carbonate, and a mixture of dimethyl carbonate (DMC) and ethyl methyl carbonate (EMC) in a ratio of 50 volume %:50 volume % was used as the chain carbonate. A ratio of the cyclic carbonate to the chain carbonate was set to 10 volume %/90 volume % to 20 volume %/80 volume %.

In this solvent, 0.55 mol/L of $LiPF_6$ as a first lithium salt and 0.55 mol/L of LiFSI as a lithium imide salt were mixed. A mole ratio of EC to $LiPF_6$ was adjusted by changing a volume % of the EC as the cyclic carbonate. As molar masses of $LiPF_6$ and EC, 151.905 g/mol and 88.06 g/mol were used, respectively. As densities of EC, DMC, and EMC, 1.321 g/mL, 1.069 g/mL, and 0.975 g/mL were used, respectively.

Figure 4:
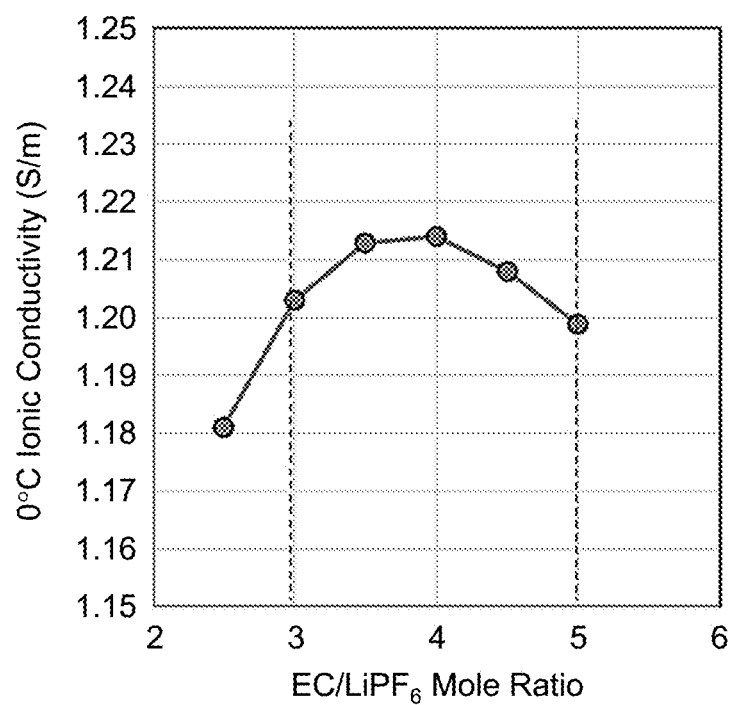
FIG. 4 is a graph illustrating an ionic conductivity relative to a mole ratio of an ethylene carbonate (EC)/$LiPF_6$.

For the obtained electrolyte solution, the ionic conductivity (S/m) at 0° C. was measured. FIG. 4 illustrates the ionic conductivity at 0° C. relative to the mole ratio of the ethylene carbonate (EC) to $LiPF_6$.

As illustrated in FIG. 4, it was found that the ionic conductivity at 0° C. was the highest when the $EC/LiPF_6$ mole ratio was around 4, and the ionic conductivity at 0° C. tended to decrease when the mole ratio decreased or increased from it. Specifically, when the mole ratio is in a range of 3 to 5, the change of the ionic conductivity at 0° C. remains within 1.5% based on the maximum value, thus being preferable. More preferably, the mole ratio is in a range of 3.5 to 4.5 when the change of the ionic conductivity at 0° C. is within 0.5% based on the maximum value.
(DCR Measurement)

First, as the positive electrode active material, a powder of $LiNi_{0.33}Co_{0.33}Mn_{0.33}$, acetylene black and graphite as the conductive auxiliary agent, and polyvinylidene fluoride (PVdF) as the binder were mixed with an weight ratio of 90:4:3:3, and the viscosity was adjusted with N-methyl-2-pyrolidone (NMP) so as to form a slurry. The positive electrode slurry was applied over both surfaces of an aluminum foil having the thickness of 15 μm, and drying and pressing were performed to manufacture the positive electrode.

Subsequently, as the negative electrode active material, a natural graphite over which an amorphous carbon was coated, styrene butadiene rubber (SBR) as the binder, and carboxymethyl cellulose (CMC) as a dispersed material were mixed with an weight ratio of 98:1:1, and the viscosity was adjusted with an ion exchanged water so as to form a slurry. The negative electrode slurry was applied over both surfaces of a copper foil having the thickness of 10 μm, and drying and pressing were performed to manufacture the negative electrode.

The separators were interposed between the manufactured positive electrode and negative electrode to manufacture the electrode wound group in the configuration illustrated in FIGS. 1 to 3, the current collector plates of the cell lid were welded to an uncoated portion of the electrode wound group, the electrode wound group was covered with the insulation protection film, sealed in the cell can, and the cell lid was welded to the cell can.

Next, as the nonaqueous electrolyte solution, in Example 1, in a solvent in which ethylene carbonate (EC), ethyl methyl carbonate (EMC), and dimethyl carbonate (DMC) were mixed with a volume ratio of 16:42:42, $LiPF_6$ as the first lithium salt was dissolved with the concentration of 0.6 mol/L and LiFSI as the lithium imide salt was dissolved with the concentration of 0.6 mol/L, thus preparing the electrolyte solution. As Comparative Example 1, in a solvent in which ethylene carbonate (EC), ethyl methyl carbonate (EMC), and dimethyl carbonate (DMC) were mixed with a volume ratio of 28:36:36, $LiPF_6$ as the first lithium salt was dissolved with the concentration of 0.6 mol/L and LiFSI as the lithium imide salt was dissolved with the concentration of 0.6 mol/L, thus preparing the electrolyte solution.

The respective prepared electrolyte solutions were injected from the liquid injection port, and subsequently, the liquid injection port was sealed with the liquid injection plugs, thus manufacturing the lithium ion secondary batteries.

After the manufactured lithium ion secondary batteries were initialized by charging and discharging, cell capacities and direct current resistances (DCR) at SOC were measured.

For the cell capacity, a constant current-constant voltage charge (CC-CV charge) was performed at a charge current of 1 CA for 2.5 hours in total until a cell voltage becomes 4.2 V. After resting for 30 minutes, constant current discharge (CC discharge) was performed at a discharge current of 0.02 CA until the cell voltage becomes 2.9 V, thus obtaining an initial capacity.

An SOC-open-circuit voltage (OCV) relation was obtained by performing discharge from the cell capacity of 4.2 V in increments of 5% of the cell capacity, and considering a voltage after resting for two hours as OCV.

DCR at SOC 50% as a low SOC region was calculated as follows. Based on the SOC-OCV relation, the CC-CV charge was performed at the charge current of 1 C from SOC 0% to SOC 50%. A temperature of a thermostatic bath was controlled to −30° C. and kept for five hours, and subsequently, the CC discharge was performed at 5 CA, 10 CA, and 15 CA for 10 seconds. A relation between a the voltage decreased from OCV in 10 seconds and the current value was plotted, and its gradient was calculated to determine DCR.

Figure 5:
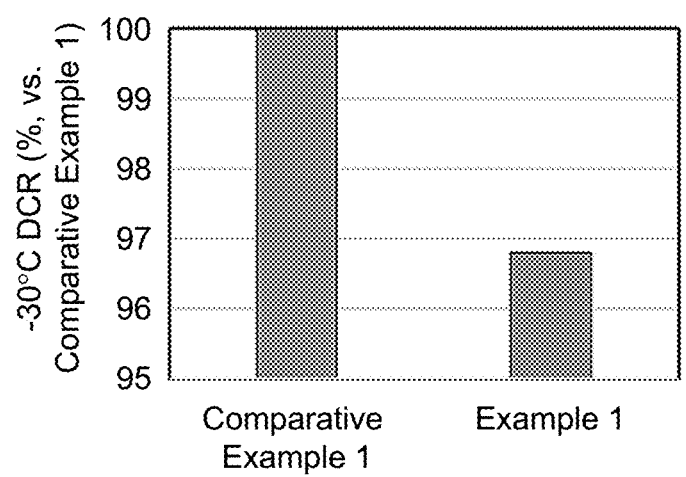
FIG. 5 is a graph illustrating a comparison result of DCR between Example 1 and Comparative Example 1.

FIG. 5 illustrates the result comparing DCR in Example 1 and Comparative Example 1. From FIG. 5, in Example 1 corresponding to the present invention, −30° C. DCR decreased by about 3% compared with Comparative Example 1, thus ensuring improvement of the output at low temperature as expected.

With the configuration of the lithium ion secondary cell as described above, the resistance, especially the resistance in the low temperature range, of the lithium ion secondary cell can be reduced, thus ensuring the improvement of the cell performance.

(Ionic Conductivity Measurement, and Evaluation of Influence on Electrode)

For an organic solvent, ethylene carbonate (EC) was used as the cyclic carbonate, and a mixture of ethyl methyl carbonate (EMC) and dimethyl carbonate (DMC) in a ratio of 50 volume %:50 volume % was used as the chain carbonate. The concentrations of the cyclic carbonate in the electrolyte solution were set to respective values indicated in Table 1.

In this solvent, $LiPF_6$ as the first lithium salt and LiFSI as the lithium imide salt were added by the amounts indicated in Table 1, thus preparing the electrolyte solutions of Examples 2 to 4 and Comparative Examples 2 to 7. For the obtained electrolyte solutions, the ionic conductivities (S/m) at 0° C. were measured. Table 1 indicates the results.

Instead of the electrolyte solutions used in Example 1 and Comparative Example 1 described above, the electrolyte solutions of Examples 2 to 4 and Comparative Examples 2 to 7 were injected and sealed, thus manufacturing the lithium ion secondary batteries. The lithium ion secondary batteries were each charged and discharged, left for one day, and subsequently dismantled to take out the electrode to visually observe the electrode. In the visual observation, corrosion states were evaluated based on discoloration and dimensional change of the aluminum foil as the current collector. When the corrosion was seen, a negative effect was determined to be "present". When the corrosion was not seen, the negative effect was determined to be "absent." Table 1 indicates the results.

TABLE 1

|  | $LiPF_6$ (mol/l) | LiFSI (mol/l) | Sum (mol/l) | LiFSI/ ($LiPF_6$ + LiFSI) (Mole Ratio) | EC (Vol %) | EC/ $LiPF_6$ (Mol) | Ionic Conductivity (S/m) | Negative Effect on Electrode |
|---|---|---|---|---|---|---|---|---|
| Example 2 | 0.6 | 0.6 | 1.2 | 0.50 | 20 | 5.0 | 1.20 | Absent |
| Example 3 | 0.75 | 0.75 | 1.5 | 0.50 | 20 | 4.0 | 1.14 |  |
| Example 4 | 0.6 | 0.6 | 1.2 | 0.50 | 20 |  |  | Absent |
| Comparative Example 2 | 1.2 | 0 | 1.2 | 0.00 | 25 | 3.1 | 1.03 | Absent |
| Comparative Example 3 | 1.2 | 0 | 1.2 | 0.00 | 5 | 0.6 | 0.95 | Absent |
| Comparative Example 4 | 1.2 | 0 | 1.2 | 0.00 | 20 | 2.5 | 1.06 | Absent |
| Comparative Example 5 | 0 | 1.2 | 1.2 | 1.00 | 20 |  |  | Present |
| Comparative Example 6 | 0.15 | 0.15 | 0.3 | 0.50 | 20 | 20.0 | 0.63 |  |
| Comparative Example 7 | 0.9 | 0.9 | 1.8 | 0.50 | 20 | 3.3 | 0.92 |  |

As indicated in table 1, the electrolyte solutions of examples 2 to 4, in which the amount of ethylene carbonate (EC) was in a range of 10 volume % to 20 volume %, 0.38 mol/L to 0.75 mol/L of $LiPF_6$ as the first lithium salt and the lithium imide salt (LiFSI) were contained, the sum of the lithium imide salt and the first lithium salt was in a range of 0.5 mol/L to 1.5 mol/L, and the mole ratio of EC/$LiPF_6$ was in a range of 3 to 5, were excellent in ionic conduction, and the negative effect on the electrode was not seen.

REFERENCE SIGNS LIST

1 Cell can
1a Opening
1b Wide-width side surface
1c Narrow-width side surface
1d Bottom surface
2 Insulation protection film
3 Wound group
5 Gasket
6 Cell lid
7 Insulating plate
9 Liquid injection port
10 Gas discharge valve
11 Liquid injection plug
12 Negative electrode external terminal
12a Negative electrode connecting portion
14 Positive electrode external terminal
14a Positive electrode connecting portion
21 Negative electrode current collector plate base portion
22 Negative electrode side connecting end portion
23 Negative electrode side opening hole
24 Negative electrode current collector plate
26 Negative electrode side through hole
32 Negative electrode
32b Negative electrode mixture layer
32c Negative electrode foil exposed portion
33 Separator 34 Positive electrode
34b Positive electrode mixture layer
34c Positive electrode foil exposed portion
35 Separator
41 Positive electrode current collector plate base portion
42 Positive electrode side connecting end portion
43 Positive electrode side opening hole
44 Positive electrode current collector plate
46 Positive electrode side through hole
100 Lithium ion secondary cell

The invention claimed is:

1. An electrolyte solution for lithium ion secondary cell, comprising:
    10 volume % to 20 volume % of ethylene carbonate (EC) as a cyclic carbonate based on organic solvent contained in the electrolyte solution;
    0.38 mol/L to 0.55 mol/L of a first lithium salt, wherein the first lithium salt consists of lithium hexafluorophosphate (LiPF6), lithium tetrafluoroborate (LiBF4), and/or lithium bis(oxalate)borate (LiBOB); and
    a lithium imide salt,
    wherein a sum of the lithium imide salt and the first lithium salt is in a range of 0.5 mol/L to 1.5 mol/L, and a mole ratio of the cyclic carbonate and the first lithium salt is in a range of 3.5 to 4.5.

2. The electrolyte solution for lithium ion secondary cell according to claim 1,
    wherein the lithium imide salt is lithium bis(fluorosulfonyl)imide (LiFSI).

3. The electrolyte solution for lithium ion secondary cell according to claim 1, further comprising
    at least one selected from ethyl methyl carbonate (EMC), diethyl carbonate (DEC), or dimethyl carbonate (DMC) as a chain carbonate.

4. The electrolyte solution for lithium ion secondary cell according to claim 3,
    wherein the chain carbonate is contained in an amount of 80 volume % to 90 volume % based on the organic solvent contained in the electrolyte solution.

5. The electrolyte solution for lithium ion secondary cell according to claim 1 further comprising:
    an additive, where an amount of the additive is in a range of 0.1 mass % to 10 mass % in total in the electrolyte solution.

6. The electrolyte solution for lithium ion secondary cell according to claim 5, wherein the additive is a sulfur-containing compound.

7. The electrolyte solution for lithium ion secondary cell according to claim 5, wherein the additive is a carboxylic acid anhydride.

8. The electrolyte solution for lithium ion secondary cell according to claim 5, wherein the additive is ethylene sulfite, 1,3-propane sultone, 1,4-butane sultone, methyl methanesulfonate, busulfan, sulfolane, or sulfolane.

9. An electrolyte solution for lithium ion secondary cell, comprising:
    10 volume % to 20 volume % of ethylene carbonate (EC) as a cyclic carbonate based on organic solvent contained in the electrolyte solution;
    0.38 mol/L to 0.55 mol/L of at least one selected from lithium hexafluorophosphate (LiPF6), lithium tetrafluoroborate (LiBF4), or lithium bis(oxalate)borate (LiBOB) as a first lithium salt; and
    a lithium imide salt, wherein the lithium imide salt is lithium bis(fluorosulfonyl)imide (LiFSI),
    wherein a sum of the lithium imide salt and the first lithium salt is in a range of 0.5 mol/L to 1.5 mol/L, and a mole ratio of the cyclic carbonate and the first lithium salt is in a range of 3.5 to 4.5.

* * * * *